Feb. 18, 1930.   P. LEMAIGRE   1,747,780
BRACKET FOR VEHICLE SPRINGS
Filed Sept. 30, 1927
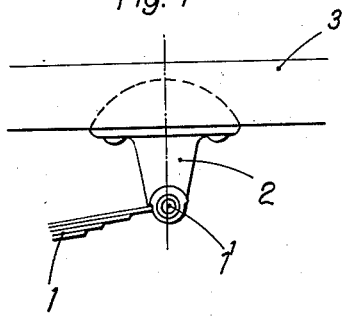
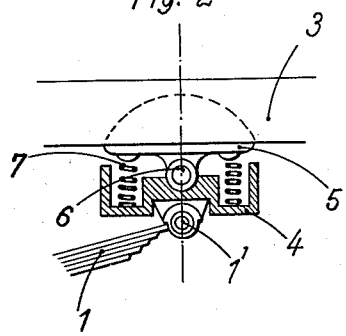
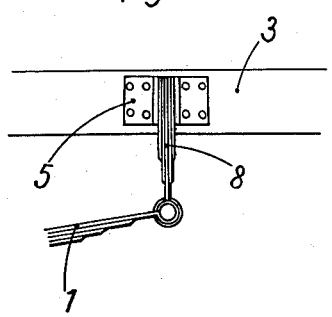

Patented Feb. 18, 1930

1,747,780

UNITED STATES PATENT OFFICE

PIERRE LEMAIGRE, OF ST.-DENIS, FRANCE, ASSIGNOR, BY MESNE ASSIGNMENTS, TO GUARDIAN TRUST COMPANY OF DETROIT, OF DETROIT, MICHIGAN, A CORPORATION OF MICHIGAN

BRACKET FOR VEHICLE SPRINGS

Application filed September 30, 1927, Serial No. 223,214, and in France October 6, 1926.

My invention relates to improvements in brackets for vehicle springs, and chiefly for motor vehicle springs.

It is well known that the front semi-elliptical springs are usually connected with the vehicle frame by means of a bolt at each end; one bolt is mounted in a bracket disposed upon the vehicle frame and is permanently secured to said bracket, whilst the second bolt is connected with the vehicle frame by means of a shackle by which the aperture or eye of the spring is made movable with reference to the vehicle frame.

It has however been observed that this construction is not entirely satisfactory, both as concerns the steering reactions and the vertical or lateral motion of the front wheels (jumping or wobbling).

By the use of my said invention I obtain favorable results as concerns the above-mentioned effects. For the front vehicle springs I employ a bracket which allows a slight motion of the end of the spring relatively to the vehicle frame. The said bracket is made in two parts whereof the first is permanently secured to the vehicle frame and the second is movable with reference to the first and is held in the middle position by strong springs which support the bolt of the vehicle spring. These two parts may be connected together by any suitable means, for instance by a bolt placed in line with or across the vehicle frame, or by a ball-and-socket joint.

In this arrangement, the end of the vehicle spring connected with the bracket is not motionless with reference to the vehicle frame but possesses a certain mobility, elastic and limited, which intervenes in the suppression of the reactions and the vertical jumping motion. The other end of the vehicle spring may be mounted on the vehicle frame by a shackle or like means affording its free motion.

The apparatus according to my invention is represented in the appended drawings.

Fig. 1 shows the known bracket employed upon motor vehicles.

Figs. 2 and 3 show two constructional forms of bracket in accordance with the invention.

As observed in Fig. 1, the semi-elliptical front vehicle spring 1 is attached by its end 1' to a bracket 2 which is permanently secured to the side beam 3 of the vehicle frame; herein the end 1' is fixed with reference to the said beam 3.

In Fig. 2, the bracket is made in two parts comprising a member 5 which is mounted on the side beam of the vehicle as in Fig. 1, and a member 4 which is pivotally mounted on the member 5 at the point 6, and to which is connected the end 1' of the spring 1. Between the members 4 and 5 are placed the strong springs 7 which hold the member 4 in its mean position on the joint 6. As herein represented, the said joint may comprise an axle pin which is perpendicular to the vehicle frame or is parallel therewith, or the joint may be of the ball-and-socket type. The other end of the vehicle spring 1 is mounted on the vehicle frame by a shackle or by like means, not shown, by which the spring will be freely movable.

It will be observed in Fig. 2 that the end 1' of the spring 1 is movable in an elastic manner and to a limited extent with reference to the vehicle frame 3, by means of the joint 6.

In Fig. 3, the end 1' of the spring 1 is mounted on the end of a plate spring 8 which is held in a bracket 5 secured to the side beam 3; the said end 1' may be connected with the plate spring 8 in any suitable manner.

The above-mentioned constructions are given solely by way of example, and I may change the forms of the several parts and chiefly the means by which the member 5 is secured to the side beam 3, without departing from the principle of my invention which essentially consists in the construction of the bracket in two parts which are relatively movable in an elastic manner and to a limited extent, one part being secured to the vehicle frame and the other part to the forward end of the vehicle spring.

I claim:

1. Mechanism for holding motor vehicle front suspension springs to suppress steering reactions and prevent jumping or wobbling of front wheels, comprising a frame part, a movable member carrying one end of the front suspension spring and pivoted both to the frame part and to said spring, and strong springs holding said member in middle position and constantly resisting movement therefrom in either direction, so that but slight and limited motion of said member is permitted.

2. Mechanism for holding motor vehicle front suspension springs to suppress steering reactions and prevent jumping or wobbling of front wheels, comprising a frame part, a movable member carrying one end of the front suspension spring and pivoted both to the frame part and to said spring, the line between the pivots being substantially vertical so that the normal support of the vehicle on said spring is unyieldingly through said member, and strong springs opposing each other to hold said member in middle position and constantly resisting movement therefrom in either direction, whereby slight and limited motion only of said member is permitted.

3. A mechanism for holding a motor vehicle front suspension spring to suppress steering reactions and prevent jumping or wobbling of front wheels, comprising a frame part, a movable member carrying one end of the front suspension spring and pivoted both to the frame part and to said spring, said movable member being under compression in its normal unyielding support of the vehicle on the spring, and strong coil springs opposing each other to hold said member in middle position and constantly resisting movement therefrom in either direction, whereby slight and limited motion only of said member is permitted.

4. A mechanism for holding a motor vehicle front suspension spring to the vehicle frame or chassis, comprising a fixed member secured to a side beam of the vehicle frame, an oscillatable member attached directly to one end of the front suspension spring, and oppositely acting springs held between said members for holding the oscillatable member in a neutral position but allowing movement of said oscillatable member a short distance in a direction to permit longitudinal movement of said vehicle spring.

5. In vehicle spring mechanism, means to suppress steering reactions and prevent jumping or wobbling of front wheels, comprising a vehicle frame part, a movable member pivoted to the frame part and to the vehicle spring, and springs on opposite sides of said pivots and acting in opposite directions to normally hold the movable member in neutral position while permitting slight and limited longitudinal movement of the vehicle spring.

In testimony whereof I affix my signature.

PIERRE LEMAIGRE.